United States Patent [19]
DeGraaf

[11] Patent Number: 5,942,563
[45] Date of Patent: Aug. 24, 1999

[54] AQUEOUS DISPERSED ACRYLIC-EPOXY, BRANCHED EPOXY PROTECTIVE COATINGS

[75] Inventor: Henry J. DeGraaf, Stow, Ohio

[73] Assignee: The Glidden Company, Cleveland, Ohio

[21] Appl. No.: 08/896,910

[22] Filed: Jul. 18, 1997

[51] Int. Cl.[6] .............................. C08K 3/20; C08L 63/02
[52] U.S. Cl. ..................... 523/412; 523/407; 523/409
[58] Field of Search ................................ 523/407, 409, 523/412

[56] References Cited

U.S. PATENT DOCUMENTS 4,474,929  10/1984  Schrader .................................. 525/482
5,508,325  4/1996  Craun et al. ............................. 523/410

*Primary Examiner*—Robert Dawson
*Assistant Examiner*—D. Aylward
*Attorney, Agent, or Firm*—Thomas M. Schmitz

[57] ABSTRACT

An aqueous protective coating composition particularly useful for can coatings is based on a polymeric binder comprising epoxy crosslinked microgel particles. The microgel polymer is produced by dispersing into water a carboxyl functional, acrylic-epoxy grafted copolymer, and combined with a high molecular weight, branched, multifunctional epoxide resin, followed by coreaction and crosslinking between the carboxyl copolymer and branched epoxide to form stable aqueous dispersed microgel particles. In a preferred aspect of the invention, low molecular weight liquid diepoxide is dispersed into and crosslinked with the carboxyl functional acrylic grafted epoxy copolymer.

11 Claims, No Drawings

AQUEOUS DISPERSED ACRYLIC-EPOXY, BRANCHED EPOXY PROTECTIVE COATINGS

This invention pertains to aqueous dispersed acrylic grafted epoxy polymers modified and crosslinked with high molecular weight branched epoxy resin to provide useful polymeric binders for protective surface coatings applied to substrates and particularly useful as can coatings for beverage and food containers.

BACKGROUND OF THE INVENTION

Industrial coatings are surface protective coatings (paint coatings) applied to substrates and typically cured or crosslinked to form continuous films for decorative purposes as well as to protect the substrate. A protective coating ordinarily comprises an organic polymeric binder, pigments, and various paint additives, where the polymeric binder acts as a fluid vehicle for the pigments and imparts rheological properties to the fluid paint coating. Upon curing or crosslinking, the polymeric binder hardens and functions as a binder for the pigments and provides adhesion of the dried paint film to the substrate. The pigments may be organic or inorganic and functionally contribute to opacity and color in addition to durability and hardness. Protective coatings which contain little or no opacifying pigments are described as clear coatings. The manufacture of protective coatings involves the preparation of a polymeric binder, mixing of component materials, grinding of pigments in the polymeric binder, and thinning to commercial standards.

Epoxy resins are particularly desirable for use in protective surface coating materials as a vehicle or polymeric binder for the pigments, fillers, and other additives where the epoxy resins advantageously provide toughness, flexibility, adhesion, and chemical resistance. Water-dispersed coating compositions containing epoxy resins are highly desirable for can coating compositions and particularly useful for interior surfaces of containers. Coatings for the interior of soft drink and beer cans, for instance, are critical due to taste sensitivity wherein such can coatings must not alter the product taste of beverages in the containers. Taste problems can occur in a variety of ways such as by leaching of coating components into the beverage, or by absorption of flavor by the coating, or sometimes by chemical reaction, or by perhaps some combination thereof.

Container coating technology frequently utilizes an epoxy resin which has been grafted with acrylic monomers, styrene, and methacrylic acid. This grafted epoxy resin is prepared in solvent, usually butyl cellosolve, and n-butanol, to maintain low processing viscosities and then reduced with water by a direct or inverse let down procedure. Although cured film properties are highly desirable, such coatings suffer from the fact that sizeable amounts of solvents are required to obtain good performance. High molecular weight epoxy resins typically require 25% to 50% solvent (based on total solids plus organic solvent) before reducing with amine and water.

Epoxy based can coatings comprising a carbon grafted acrylic chain are disclosed is commonly assigned U.S. Pat. No. 4,212,781 which teaches a carbon grafting process involving solvent polymerization at moderate temperatures with high levels of peroxide initiator to produce a carbon-graft polymer. The high solvent levels, however, invariably carry over to the aqueous dispersion when the resulting polymers are dispersed into water to produce a VOC (volatile organic compounds) level considerably above 2 and typically between 3 and 4 pounds volatile organic compounds per gallon of resin solids. The acrylic grafted epoxy is particularly useful when utilized with a coreactive crosslinking melamine crosslinker.

Aqueous coating compositions based on microgel resin reaction product obtained by the esterification reaction of epoxy resin with carboxyl group containing vinyl polymer are disclosed in U.S. Pat. No. 4,897,434 where major amounts of high molecular weight epoxy are esterified in organic solvent with the carboxyl vinyl polymer to produce a non-gelled epoxy ester. The epoxy ester is subsequently dispersed into water followed by further coreacting of available epoxy and carboxyl groups on the preformed epoxy ester to form a microgel product. In commonly assigned U.S. Pat. No. 5,508,325, aqueous dispersed microgel polymers are produced by dispersing carboxyl functional acrylic grafted epoxy resin into water followed by dispersion of liquid diepoxide and then crosslinking by the diepoxide. Similar aqueous dispersed diepoxide crosslinked microgel polymeric compositions are disclosed in related U.S. patents U.S. Pat. No. 5,464,885, U.S. Pat. No. 5,554,671, U.S. Pat. No. 5,526,630 and U.S. Pat. No. 5,526,361.

It now has been found that excellent aqueous dispersed protective coating compositions exhibiting improved film integrity properties can be prepared in a similar fashion based on a polymeric binder comprising an aqueous dispersed acrylic-epoxy copolymer, modified with high molecular weight, branched, multifunctional epoxide resin. In accordance with this invention, a branched, high molecular weight epoxy resin is added to the acrylic-epoxy copolymer at the point of dispersing into water rather than premixing the branched epoxy with acrylic-epoxy copolymer. In this regard, the branched epoxy is first mixed with minor amounts of a co-solvent, preferably heated moderately, whereupon the heated mixture is dispersed directly into the previously emulsified acrylic-epoxy copolymer. In has been found by this process that the branched epoxy does not cause an excessive viscosity increase which otherwise occurs due to esterification when mixed directly with the carboxyl functional acrylic-epoxy copolymer prior to forming a dispersion in water. Undesirable esterification reactions ordinarily would cause a considerable increase in viscosity depending on the temperature of the resin mixture and the resident time prior to dispersion into water. However, when the branched epoxy is post added to a previously dispersed (emulsified) carboxyl functional polymer, the viscosity increase can be minimized. After dispersion into water, the branched multifunctional epoxide resin is heat reacted with carboxyl acrylic-epoxy copolymer to form aqueous dispersed crosslinked microgel polymer particles. If desired, low molecular weight diepoxide may also be dispersed into the aqueous polymeric mixture and subsequently coreacted with carboxyl functionality on the dispersed acrylic-epoxy copolymer to crosslink and form aqueous dispersed microgel particles. The microgel emulsion prepared in this way is a stable, aqueous dispersion of small particle size microgel and is useful as a polymeric binder for coatings and particularly exhibiting excellent smoothness, clarity, gloss, and water resistance.

In accordance with this invention, high molecular weight, branched, multifunctional epoxide resins can be dispersed into aqueous emulsions of acrylic grafted linear epoxy resins without undesirably increasing the viscosity of the undispersed resin mixture or increasing VOC's to provide highly resistant sanitary can coatings to a wide variety of foods. The branched epoxy increases the weight average molecular weight of the acrylic-epoxy resin while avoiding the extremely high viscosities which result from adding the branched epoxy prior to the let-down of the resin into water. Upon aqueous dispersion, the branched, high molecular weight epoxy resin is heat reacted and crosslinked with the carboxyl acylic-epoxy copolymer, which not only raises the molecular weight of the acrylic modified linear epoxy copolymer, but effectively reinforces the crosslinked resin mixture with attendant superior resin properties. The advantages achieved with added branched epoxy resin containing higher levels of oxirane functionality include a coating having a stronger polymer network along with improved flexibility, better substrate adhesion, and greater food resistance. Further advantages are realized by reducing or eliminating the need for melamine crosslinkers and the reduction or elimination of phenolics in sanitary food coatings. These and other advantages of this invention will become more apparent by referring to the detailed description of the invention and the illustrative examples.

SUMMARY OF THE INVENTION

Briefly, the invention pertains to aqueous dispersed protective coating compositions containing a polymeric binder containing low levels of organic solvent produced by dispersing a carboxyl functional acrylic-epoxy resin into water along with high molecular weight, highly branched epoxy to form an aqueous resin mixture. The acrylic-epoxy copolymer provides a dispersing medium and readily suspends the branched epoxy in the aqueous dispersion. After dispersion of the branched high molecular weight epoxy resin, the multi-functional branched epoxy is coreacted and crosslinked with the carboxyl functional acrylic grafted epoxy to form a stable dispersed, crosslinked microgel particles containing by weight between about 50% and 95% acrylic-epoxy copolymer with the balance being crosslinking branched epoxy. In a preferred aspect of this invention, low molecular weight diepoxide can be further added to the aqueous dispersion and likewise crosslinked with carboxyl functional acrylic-epoxy copolymer.

DETAILED DESCRIPTION OF THE INVENTION

The aqueous dispersed microgel polymer of this invention is based on a carboxyl functional acrylic-epoxy copolymer dispersed into water and crosslinked by branched high molecular weight, multi-functional epoxide resin in the aqueous dispersion to produce the aqueous dispersed microgel polymer particles.

The epoxy-acrylic copolymer is a copolymer comprising epoxy resin coreacted with ethylenic monomers including acrylic carboxyl monomers to produce an epoxy-acrylic copolymer. The preferred epoxy-acrylic copolymer comprises an epoxy-acrylic graft copolymer containing epoxy resin, epoxy-acrylic graft copolymer, and ungrafted addition polymer produced by polymerizing ethylenically unsaturated monomers in-situ with epoxy resin in the presence of a peroxide. The in situ polymerization of monomers generally comprises reacting the ethylenically unsaturated monomers in the presence of epoxy with about 1% to 10% peroxide by weight based on the monomer copolymerized. The in-situ formed carboxyl-functional copolymer can have a molecular weight between 1,000 and 100,000 and preferably between 2,000 and 20,000. The carboxyl content (COOH) should comprise at least 5% by weight of the monomer mixture and preferably should be above 15%. The Acid Number of the graft copolymer mixture should be above 30 and preferably between 70 and 300 mg KOH per gram of resin solids.

Based on the weight of the acrylic grafted epoxy copolymer, the copolymerized acrylic or methacrylic acid content preferably is between 5% and 40% by weight of the copolymer.

The epoxy resin portion of the epoxy-acrylic copolymer mixture can be either aliphatic or aromatic, although the aromatic epoxy resins are preferred. The most preferred epoxy resins are polyglycidyl ethers of bisphenol-A, especially those having 1,2-epoxy equivalency between about 1.3 to about 2. The molecular weight should be from about 350 to about 20,000 and preferably, for sanitary coating compositions, from about 2,000 to about 10,000. Mixtures of monoepoxides and diepoxides are desirable. Another procedural variation is the introduction of the aromatic polyether which is devoid of oxirane functionality by reacting epoxide groups with benzoic acid, fatty acid, phenol or similar monoreactive epoxide blocking agent. In preferred practice, the epoxy resin is a mixture including aromatic polyether having a single oxirane group and aromatic polyether having two oxirane groups which maximizes compatibility.

Epoxy resins are predominantly linear chain molecules comprising the coreaction product of polynuclear dihydroxy phenols or bisphenols with halohydrins to produce epoxy resins containing at least one and preferably two epoxy groups per molecule. The most common bisphenols are bisphenol-A, bisphenol-F, bisphenol-S, and 4, 4'dihydroxy bisphenol, with the most preferred being bisphenol-A. Halohydrins include epichlorohydrin, dichlorohydrin, and 1,2-dichloro 3-hydroxypropane with the most preferred being epichlorohhydrin. Preferred epoxy resins comprise the coreaction product of excess molar equivalents of epichlorohydrin and bisphenol-A to produce predominantly an epoxy group terminated linear molecular chain of repeating units of diglycidyl ether of bisphenol-A containing between 2 and 25 repeating copolymerized units of diglycidyl ether of bisphenol-A. In practice, excess molar equivalents of epichlorohydrin are reacted with bisphenol-A to produce epoxy resins where up to two moles of epichlorohydrin coreact with one mole of bisphenol-A, although less than complete reaction can produce difunctional epoxy resin along with monoepoxide chains terminated at the other end with a bisphenol-A unit. The most preferred linear epoxy resins are poly-glycidyl ethers of bisphenol-A having terminating 1,2-epoxide groups and an epoxy equivalent weight between 2,000 and 10,000, and a number average molecular weight from about 4,000 to 20,000 as measured by gel permeation chromatography (GPC). A desirable procedure is to react a commercial diglycidyl ether of bisphenol-A (liquid epoxy) with additional bisphenol-A to increase the molecular weight. The desired molecular weight and final oxirane content is controlled by adjusting the ratio of the two components and the extent of the reaction. Commercially available epoxy resins include Dow Chemical epoxy resins identified by trade number and equivalent molecular weights as follows: DER 661 (525); DER 664 (900); while Shell Chemical epoxy resins are EPON 1001 (525); EPON 1007 (2000); EPON 1009F (3000); and Ciba-Geigy linear epoxy resins GT-7013 (1400); GT-7014 (1500); GT7074 (2000); and GT-259 (1200). Although not as common, trifunctional epoxy resins are useful comprising branched chain epoxy resins where the branched chains as well as the backbone chain are each terminated with a terminal epoxide group to provide greater than two epoxide functionality. Trifunctional epoxy resins can be produced by coreacting epichlorohydrin with polynuclear polyhydroxy phenols, trifunctional phenols, or aliphatic trifunctional alcohols.

The acrylic portion of the epoxy-acrylic copolymer comprises polymerized ethylenically unsaturated monomers which include carboxyl functional monomers such as acrylic acid, and lower alkyl substituted acrylic acids such as methacrylic acid, and unsaturated dicarboxylic acids such as maleic or fumaric, to provide carboxyl functionality means for dispersing the epoxy-acrylic copolymer mixture into water. The preferred acrylic acid is methacrylic acid. The balance of the monomers preferably are non-functional under the contemplated conditions of polymerization, although small amounts of other reactive monomers may be used such as hydroxy monomers illustrated by 2-hydroxy ethyl methacrylate, amide monomers illustrated by acrylamide, or N-methylol monomers illustrated by N-methylol acrylamide. The remaining monomers are non-functional but copolymerizable ethylenic monomers illustrated by acrylate and methacrylate esters, such as ethyl acrylate, methyl methacrylate or isobutyl methacrylate, styrene, or vinyl toluene, vinyl acetate, vinyl chloride, vinylidene chloride, acrylonitrile, and generally alkyl esters of an acrylic acid, generally the lower alkyl esters, that is, those esters in which the esterifying group contains from 1 to 4 carbon atoms, and particularly ethyl acrylate. Other useful monomers in this class include other $C_{1-5}$ alkyl acrylate esters and methacrylate esters such as, for example, propyl acrylate, isopropyl acrylate, butyl acrylate, isobutyl acrylate, tertiary butyl acrylate, pentyl acrylate, decyl acrylate, lauryl acrylate, isobornyl acrylate, methyl methacrylate, butyl methacrylate, isobutyl methacrylate, hexyl methacrylate, 2-ethyl hexyl methacrylate, octyl methacrylate, and nonyl methacrylate. Other useful monomers are those readily commercial available monomers having vinyl unsaturation and include styrenic monomers such as styrene, vinyl toluene, divinyl benezene, isoprene and butadiene. The acrylic, methacrylic or similar unsaturated carboxyl monomer preferably comprises by weight between about 5% and 40% based on the weight of the acrylic grafted epoxy copolymer. Based on monomer weights copolymerized, the preferred acrylic acid or methacrylic acid monomer should comprise between 5% and 99% of the monomer copolymerized.

The preferred graft epoxy-acrylic copolymer mixture is prepared by in-situ non-aqueous polymerization of the ethylenic monomers with epoxy resin. The epoxy resin can be heated in a reactor wherein the polymerizable monomer can be added slowly over a period of at least two or three hours along with a solvent and a free radical initiator. Although the reaction may be conducted in the absence of solvent, a solvent is preferred for the in-situ polymerization of monomers in the presence of epoxy resin. Solvents such as xylene, benzene, ethyl benzene, toluene, and the alkoxy alkanols are satisfactory. Alcohols such as methanol, ethanol, propanol, butanol, and the like, are suitable, with ethylene glycol monobutyl ether and butanol being preferred. Ethylene glycol monobutyl ether, ethylene glycol monohexyl ether, diethylene glycol monobutyl ether, and the like are most suitable. For subsequent dispersion into water, the solvents selected should be water-soluble materials, such as butanol, propanol, ethylene glycol monoethyl ether, and the like, although small amounts of mineral spirits, hexane, and similar aliphatics may be used. Ordinarily the amount of solvent may be in the range from about 5% to 40% by weight of the sum of the other components. For low VOC polymer dispersions, the amount of solvent can range from about 5% to about 30% by weight of the other components, excluding water. Stated alternatively, the ratio of organic solvent (OS) to solid polymer (S) is where OS/S is within the range of about 0.07 and about 0.45.

In practice, the epoxy resin and the mixture of polymerizable monomers are reacted together in the presence of a free radical initiator, preferably of the peroxide type, where benzoyl peroxide and t-butyl perbenzoate are most preferred. Typical and useful free radical initiators include cumene hydroperoxide, benzoyl peroxide, t-butyl perbenzoate, t-butyl peroxide, lauryl peroxide, methyl ethyl ketone peroxide, dicumyl peroxide, chlorobenzoyl peroxide, and the like. Benzoyl peroxide and t-butyl perbenzoate are preferred as the free radical initiator for use in the practice of the present invention. The amount of free radical catalyst is expressed in terms of percentage by weight of peroxide based on the total weight of the polymerizable monomer, or equivalent, at the temperature of use. The amount of peroxide catalyst should be at least about 1% and preferably between 2% and 10% by weight peroxide initiator based on the weight of ethylenic monomers copolymerized. The monomers and initiators are heated at a reaction temperature preferably maintained in the range from about 80° C. to about 180° C., although the temperature may be adjusted within a relatively wide range to accommodate the reactivity of the mixture. Operating temperatures in the range from about 30° C. to about 200° C. are feasible, depending upon the end results and operating conditions selected, although the preferred temperature range is between 100° C. and 180° C. After the monomers are added, the reaction mixture is normally held for up to three hours at reaction temperature to complete the monomer conversions. The in-situ polymerization of the monomers produces an in-situ formed carboxyl functional polymer containing at least about 5% of polymerized acid monomer based on the total weight of monomers. The acrylic grafted epoxy copolymer should have an Acid Number above about 30 and preferably between 70 and 300 mgm KOH per gram of polymer. The epoxy-acrylic grafted copolymer composition comprises by weight between about 20% and 95% acrylic polymer and between about 5% and 80% epoxy resin.

The epoxy-acrylic grafted copolymer is prepared in solvent and then subsequently dispersed into water using a fugitive base such as primary, secondary, and tertiary alkyl, alkanol, aromatic amines, or alkanolalkyl mixed amines such as mono-ethanol amine, dimethyl ethanol amine, diethanol amine, triethyl amine, dimethyl aniline, ammonium hydroxide, and the like, as more particularly described in U.S. Pat. No. 4,212,781.

In accordance with this invention, the high molecular weight, branched, multifunctional epoxide resins comprise branched chains as well as backbone chains where the branched chains and backbone chains are each predominantly terminated with a terminal epoxide group to provide multi-epoxide functional resins having at least two, and preferably three or more, terminal epoxide groups per molecule. Polyfunctional branched epoxy resins can be produced by reacting halohydrins with polynuclear polyhydroxys such as polydroxy phenols, trifunctional phenols or aliphatic trifunctional alcohols. Suitable halohydrins include epichlorohdrin, dichlorohydrin, and 1,2-dichloro-3-hydroxypropane with the most preferred being epichlorohydrin. In commercial practice, excess molar equivalents of epichlorohydrin are reacted with polynuclear polyhydroxy components to produce multifunctional, branched, low to medium molecular weight epoxy resins, which are subsequently advanced in molecular weight.

The molecular weight advancement process utilizing the chain extension reaction of liquid epoxy resin with bisphenol-A is preferred for producing higher molecular weight epoxy linear resins as well as producing high molecular weight branched epoxy resins. In this regard high molecular weight branched epoxy resins can be produced by the liquid epoxy molecular advancement process since high reaction temperatures during the advancement process allows for some side reactions to occur between oxirane groups and secondary hydroxyls on the epoxy backbone. Hydroxlated solvents should be minimized or eliminated during the advancement process to avoid chain terminating side reactions. Molecular weight advancement and branching can be promoted by catalysts such as aryl or alkyl phosphonium salts, amine compounds such as tributylamine and triethanolamine, and imidazoles. Low molecular weight multifunctional epoxy resins such as epoxy phenol novolac resins and o-cresol novolac epoxy are useful to modify conventional bisphenol-A epoxy resins and can be used to prepare branched epoxy resins having a wide range of desired molecular weights. Branched epoxy resins have a 1,2 epoxy equivalent functionality above 2, preferably between 2.2 and 4, and as high as 5.5. The number average molecular weight should range from about 400 to 6,000 and preferrably between about 1000 and 4000 as measured by GPC. The epoxide equivalent weight (EEW or WPE) should range between between 400 and 3000. The preferred weight percent of oxirane should be between about 0.6% and 4% (i.e EEW between 400 and 2667). Commercially available branched epoxy resins identified by trade number and molecular weight include for instance:

| Resin No. | Epoxy funct. | Molec. Wt. | WPE | Type |
| --- | --- | --- | --- | --- |
| DEN-431 | 2.2 | 387 | 175 | epoxy phenol novalac |
| DEN-438 | 3.6 | 645 | 178 | epoxy phenol novalac |
| DEN-439 | 3.8 | 762 | 200 | epoxy phenol novalac |
| ECN-1235 | 2.7 | 540 | 200 | epoxy cresol novalac |
| ECN-1273 | 4.8 | 1080 | 225 | epoxy cresol novalac |
| ECN-1280 | 5.1 | 1170 | 229.4 | epoxy cresol novalac |
| ECN-1299 | 5.4 | 1270 | 235.2 | epoxy cresol novalac |

DEN resins are produced by Dow Chemical and ECN resins are produced by Ciba-Geigy Corp. In commercial practice, low molecular weight branched epoxy resins are advanced to molecular weights preferably between 2500 and 4000. Other low molecular weight hybrid commercial epoxy resins identified as novalac modified, Bis-A, solid epoxy resins include (Dow) DER-642U (EEW 500–580; titrated % oxirane=2.92; calculated EEW=547.9; Wt.av. MWt=5598 by GPC; No.av.MWt.=1169 by GPC; Mw/Mn=4.79; calculated epoxy functionality Mn/EEW=2.13) and (Dow) DER-672U (EEW 750–850; titrated % oxirane=1.8835; calculated EEW=849.5; Wt.av.MWt=9915; No.av.MWt.=1773; Mw/Mn=5.59; calculated epoxy funct.=2.087).

Although not as common, high molecular weight, branched, multifunctional glycidyl resins are branched polyepoxide resins also useful in this invention. Such branched glycidyl resins comprise addition copolymers produced by copolymerizing ethylenically unstaurated monomers including glycidyl or oxirane functional monomers with branched ester acrylates of a polyhydric polyol such as glycerol, pentaerythritol, dipenaerythritol, trimethylol propane, and similar acrylate esters of higher polyols. Oxirane monomers characteristically contain epoxide functionality along with pendant double bond functionality such as acrylic, methacrylic or vinyl derivatives of glycidol. Preferred oxirane monomers include glycidyl acrylate, glycidyl methacrylate, and allyl glycidyl ether. The oxirane monomers can be copolymerized with ethylenically unsaturated monomers such as vinyl aromatic or aliphatic hydrocarbons and acrylic monomers.

In accordance with the process of this invention, the high molecular weight, branched, multifunctional epoxide resin is dispersed into the aqueous dispersed acrylic-epoxy copolymer concurrently with or after the carboxyl functional acrylic-epoxy coploymer is dispersed into water. After both the acrylic-epoxy and the branched multifunctional epoxy are dispersed into water, the aqueous mixture of polymers is heated moderately to cause esterification between the carboxyl groups on the acrylic-grafted epoxy and epoxide groups on the branched epoxy to provide stable, aqueous dispersed microgel polymer particles. The water dispersed micogel polymer particles comprise by weight between about 50% and 95% of acrylic-epoxy copolymer with the balance being branched epoxy. The microgel polymer particles are particularly useful as a polymeric binder for protective coatings and particularly useful for can coatings.

In accordance with a preferred aspect of this invention, a low molecular weight diepoxide can be added to the water dispersed carboxyl functional, acrylic-epoxy copolymer to provide further crosslinking and microgel formation by heating moderately the aqueous polymeric mixture. The low molecular weight diepoxide resins useful for crosslinking the carboxyl functional acrylic graft epoxy copolymers are predominantly linear chain molecules comprising the coreaction product of polynuclear dihydroxy phenols or bisphenols with halohydrins to produce epoxy resins containing preferably two epoxy groups per molecule. The most common bisphenols are bisphenol-A, bisphenol-F, bisphenol-S, and 4,4 dihydroxy bisphenol, with the most preferred being bisphenol-A. Halohydrins include epichlorohydrin, dichlorohydrin, and 1,2-dichloro-3-hydroxypropane with the most preferred being epichlorohydrin. Preferred epoxy resins comprise the coreaction product of excess molar equivalents of epichlorohydrin with bisphenol-A to produce predominantly an epoxy group terminated linear molecular chain of repeating units of diglycidyl ether of bisphenol-A containing between 2 and 25 repeating copolymerized units of diglycidyl ether of bisphenol-A. In practice, an excess molar equivalent of epichlorohydrin are reacted with bisphenol-A to produce diepoxide epoxy resins where up to two moles of epichlorohydrin coreact with one mole of bisphenol-A, although less than complete reaction can produce difunctional epoxy resin along with monoepoxide chains terminated at the other end with a bisphenol-A unit. The preferred linear epoxy resins are polyglycidyl ethers of bisphenol-A having terminating 1,2-epoxide groups (oxirane groups) and a number average molecular weight between 200 and 5,000 and preferably from about 360 to 1,000 as measured by gel permeation chromatography (GPC). Commercially available lower molecular weight epoxy resins include Dow Chemical epoxy resins identified by trade number and average molecular weights as follows: DER 333 (380); DER 661 (1050); while Shell Chemical epoxy resins are EPON 828 (380); EPON 836 (625); EPON 1001 (1050); and Ciba-Geigy linear epoxy resins GT-7013 (1400); GT-7014 (1500); GT-7074 (2000) and GT-259 (1200). The low molecular weight diepoxide resins have an epoxide equivalent weight between about 180 and 500. Higher molecular weight diepoxides do not disperse well unless pre-mixed with a suitable coupling solvent.

Epoxy resins further include non-aqueous alkylene oxide resins which are epoxide functional resins comprising an alkylene oxide adduct of a bisphenol compound. The alkylene oxide is an aliphatic alkyl derivative having up to about 26 carbon atoms although preferred oxides are lower alkyl oxides such as ethylene, propylene, and butylene oxides. Bisphenol compounds including bisphenol-A, bisphenol-F and bissulfone or sulfides. Typically two or more moles of alkyl oxide are coreacted with one mole of bisphenol compound. Preferred compositions are 2:1 molar reactions while suitable molecular weight range of alkylene oxide resins is between 200 and 1,000 as measured by GPC. Other suitable epoxide functional resins include low molecular weight polyepoxides such as epoxidized sorbitol and epoxy novolacs.

In accordance with this preferred aspect of the invention, the microgel polymeric composition comprises on a weight basis between about 50% and 95% acrylic-epoxy copolymer and between about 5% and 50% branched multifunctional epoxide resin. Optionally, additional amounts of at least 1%, and preferably from 4% to 12% of low molecular weight linear diepoxide based on the weight of the acrylic-epoxy copolymer can be added if desired. The resulting compositions contain 50% to 94% epoxy-acrylic copolymer, 5% to 50% branched multifunctional epoxide, and 1% to 12% diepoxide.

In accordance with the process of this invention, direct or reverse let down procedures can be used for inversion of the acrylic-epoxy copolymer into water. Ammonia is frequently preferred as the inverting base because ammonia gives no added VOC. Common amines, such as dimethylethanol amine, tributyl amine, triethyl amine, or similar tertiary amine can be used, alone or in combination with ammonia. Neutralization levels of the carboxyl functional acrylic graft epoxy copolymer preferably are between 40% and 100% of the available carboxyl groups. The acrylic-epoxy copolymer is best inverted hot, at or below synthesis temperature, as viscosity rises at lower temperatures to the point where inversion into water is difficult. Good mixing (low to moderate shear) is required for the inversion of the copolymer in water. Concurrently with or after dispersing the acrylic-epoxy copolymer into water, the branched multifunctional epoxy resin is dispersed within the aqueous dispersed acrylic-epoxy copolymer to provide a stable mixture. The preferred method is to first disperse epoxy-acrylic copolymer into water and thereafter disperse the branched multifunctional epoxy resin into the water dispersed copolymer. The aqueous mixture is heated moderately, preferably between about 75 and 95 degrees C., for time sufficient to induce crosslinking between the carboxyl functional acrylic-epoxy copolymer and the branched multifunctional epoxide resin.

In accordance with a preferred aspect of this invention, liquid epoxy resins such as DER 333 (Dow) or Epon 828 (Shell) can be blended with the acrylic grafted epoxy resin prior to, or after inversion into water. If diepoxide is added to acrylic-epoxy copolymer prior to inversion (dispersion) into water, care must be taken because to avoid coreaction of the diepoxide with carboxyl groups on the acrylic epoxy copolymer and resulting gelation. The preferred method is to first disperse the acrylic-epoxy copolymer into water and thereafter disperse the branched multifunctional epoxide resin followed by optionally adding, if desired, liquid linear diepoxide into the aqueous dispersed mixture. Both the branched multifunctional epoxy resin and the linear liquid diepoxide disperse easily when added to the acrylic-epoxy aqueous dispersion. Addition of low molecular weight liquid linear diepoxide along with the multifunctional branched epoxy resin is preferred.

After the water dispersed acrylic-epoxy copolymer is mixed with the branched multifunctional epoxide resin and the linear diepoxide, heat can be applied to increase the rate of the acid-epoxy crosslinking reaction. Catalysts such as tertiary amines, phosphines, pyridine, and the like can be added at low levels (0.1 to 1%) to further increase the acid-epoxy reaction rate. Viscosity generally rises as this reaction occurs. If tertiary amine is used as a portion of the neutralizing base, up to 10% additional amine can be used. Alternately, the acid-epoxy reaction in water will occur at room temperature over a longer period of time, although this procedure is not preferred. It is important that adequate mixing is applied to the dispersed aqueous mixtures to insure that the added branched epoxy resin and the added liquid linear diepoxide are able to maintain sufficient contact with acylic-epoxy copolymer, permitting the desired microgel crosslinking reaction to occur. Similarly, it is important to avoid over reducing the polymeric dispersion with excessive amounts of water prior to the microgel reaction to permit required intermixing of the epoxy resins with the water dispersed acrylic-epoxy copolymer to enable complete reaction between the epoxide groups and carboxyl groups in the microgel formation. The resulting epoxy crosslinked addition copolymers comprise an aqueous micro-dispersion of very small crosslinked polymer particles having a mean microgel particle size below 1.0 microns, desirably less than 0.2 micron, and preferably between 0.02 and 0.2 micron size particles. The microgel polymer particles have an Acid No. above 30 and preferably between 50 and 150. The aqueous dispersed acrylic-epoxy crosslinked microgel particles provide excellent film forming properties. On a weight basis, the crosslinked microgel particles comprise between about 50% and 95% acrylic grafted epoxy copolymer and between 5% and 50% branched multifunctional epoxy, and, optionally, between 4% and 12% of liquid linear diepoxide resin.

The resulting microgel dispersions are particularly useful as polymeric binders in coatings for containers. The resulting epoxy crosslinked microgel polymer particles produced by carboxyl functional acrylic-epoxy copolymer (dispersing agent) crosslinked by branched multifunctional epoxide resin and difunctional low molecular weight epoxy surprisingly provides highly crosslinked copolymers in the form of a stable aqueous microdispersion of extraordinary small internally crosslinked microgel polymer particles. Excellent protective film formations on substrates are achieved without surfactants even though the microgel particles are internally highly crosslinked. Hence, high quality coatings for interior food and beverage cans can be produced with acrylic-epoxy copolymer, crosslinked microgel polymeric particles. Aqueous dispersions of these blended resins can be prepared in water with dimethylethanolamine and/or ammonia neutralization with minimal use of volatile solvent and at VOC levels below 2.5 pounds per gallon of resin emulsion (minus water), and preferably between about 0.5 to 2 pounds per gallon of resin emulsion (minus water). Cured films exhibit good flexibility and adhesion along with good clarity and gloss.

For spraying, preferably the coating composition contains between about 10% and 40% by weight polymeric solids relative to 60% to 90% water including other volatiles such as minor amounts of solvents. For applications other than spraying, the aqueous polymeric dispersions can contain between about 5% and 50% by weight of polymer solids. Organic solvents can be utilized to facilitate spray or other application methods and such solvents preferably include n-butanol and 2-butoxy-ethanol-1, with lesser amounts of aromatic naphtha, ethyl benzene, xylene, and toluene. Preferably n-butanol is used in combination with 2-butoxy-ethanol-1. The coating composition of the present invention can be pigmented and/or opacified with known pigments and opacifiers. For many uses, including food use, the preferred pigment is titanium dioxide. The resulting aqueous coating composition can be applied satisfactorily by conventional methods known in the coating industry. Thus, spraying, rolling, dipping, and flow coating application methods can be used for both clear and pigmented films, although spraying is preferred. After application onto the metal substrate, the coating is cured thermally at temperatures in the range from about 150° C. to 220° C. or higher for time sufficient to effect complete curing as well as volatilizing of any fugitive component therein.

For metal sheet substrates intended as beverage containers and particularly for carbonated beverages such as beer, the coating should be applied at a rate in the range from 0.5 to 15 milligrams of polymer coating per square inch of exposed metal surface. To attain the foregoing, the water-dispersible coating can be applied as thick as 0.1 to 1 mil.

For a better understanding of the present invention, the following examples are provided. In this application, all parts are parts by weight, all percentages are weight percentages, and temperatures are degrees Centigrade, unless otherwise expressly noted.

PROCESS FOR EXAMPLES

Acrylic grafted epoxy crosslinked with branched epoxide in Examples 1–5 were produced from the following raw materials and processed as indicated.

Group Raw Material

| Group | Raw Material |
|---|---|
| A | Epoxy resin in solvent, Mw = 14,746, Mn = 5062, EEW = 3101, Wt. % oxirane = 0.52% Ethylene glycol monobutyl ether (EG-mBE) n-Butanol |
| B | Styrene Methacrylic acid (MAA) Ethyl acrylate (EA) t-butyl perbenzoate |
| C | Ethylene glycol monobutyl ether (EG-mBE) |
| D | n-Butanol |
| E | Dimethyl ethanolamine (DMEA: to partially neutralize carboxyls) Deionized water |
| F1 | Deionized water |
| G | High MWt., branched epoxy, in Eg-mBE solution, preheated to 82 degrees C., ratio of OX/AROH = 1.156; Wt.av.MWt. = 7698 calculated and 16494 by GPC; No.av.MWt = 3948 calculated, 4514 by GPC; Mw/Mn = 1.95 calculated, 3.65 by GPC; 0.687 oxirane % and 2330 EEW; dispersed in EG-mBE, BuOH |
| F2 | Deionized water |
| H | DER 333 liquid diepoxide resin |
| F3 | Deionized water |
| F4 | Deionized water. |

Processing Procedure. Heat group A components to 150 degrees C. and hold. Add group B monomer components to the epoxy resin over about two hours, while maintaining reaction mixture between about 148 and 154 degrees C. Add group C to rinse monomers and hold reaction temperature at 149 to 153 degrees C. for about one hour, then cool to about 134 degrees C. At 120 to 140 degrees C., add D n-butanol and cool to 105 degrees C. Premix group E amine and water and add to the reaction mixture at about 96 to 105 degrees C. Add 50 grams of F1 rinse and hold for about 20 minutes at 92 to 96 degrees C., and, when mixed into the reaction mixture well, add remaining group F1 deionized water over 60 minutes while maintaining a reaction temperature of about 88 to 96 degrees C. Then add G, the heated branched epoxy, followed by the additional deionized water F2. Add H, the DER 333 liquid diepoxide, followed by F3 deionized water addition over 120 to 150 minutes. After F3 is added, hold for an additional 20 to 60 minutes at 88 to 90 degrees C. Cool batch to below 35 degrees C., then add F4 and mix in.

EXAMPLES

| Group | Material | Ex.1 | Ex.2 | Ex.3 | Ex.4 | Ex.5 | |
|---|---|---|---|---|---|---|---|
| A | Epoxy | 753.1 | 753.8 | 528 | 574.6 | 673.9 | |
|  | EG-mBE | 254.4 | 254.6 | 203.3 | 188.3 | 240 | |
|  | n-Butanol | 21.6 | 21.6 | 15.1 | 22.1 | 4.9 | |
| B | Styrene | 180.7 | 181 | 181 | 197 | 197 | |
|  | MAA | 220.9 | 221 | 221 | 240.6 | 240.6 | |
|  | EA | 100.4 | 100.5 | 100.5 | 109.4 | 109.4 | |
|  | t-BPB | 35.1 | 35.2 | 35.2 | 38.3 | 38.3 | |
| C | EG-mBE | 51.7 | 50.2 | 95.4 | 108 | 99.8 | |
| D | n-Butanol | 60.2 | 40.2 | 32.7 | 49.2 | 24.6 | |
| E | DMEA | 115.5 | 115.6 | 115.6 | 125.8 | 125.8 | |
|  | Water | 115.5 | 115.6 | 115.6 | 125.8 | 125.8 | |
| F1 | Water | 50.2 | 50.2 | 900.2 | 1055 | 1174.7 | |
| G | Br.epoxy | — | — | 235.6 | 257 | 164.1 | |
|  | linear epoxy |  | 96.6 |  |  |  | |
|  | EG-mBE, BuOH | — | 35.4 | 85.7 | 93.4 | 84.9 | |
| F2 | Water | 1000 | 1180 | 150 | 200 | — | |
| H | Diepoxide | 83.6 | 74 | 78 | 94.6 | 95.1 | |
| F3 | Water | 1100 | 820 | 1150 | 1320 | 1300 | |
| F4 | Water | 250 | — | 276.3 | 30 | 160 | |
| Emulsion microgel properties |  |  |  |  |  |  | Control |
| NVM % |  | 31.8 | 36.7 | 31.4 | 32.4 | 31.9 | 32.4 |
| Visc., #4 Ford, seconds |  | 69 | 72 | 75 | 75 | 77 | 45 |
| VOC measured |  | 1.71 | 1.70 | 1.90 | 1.88 | 1.93 | 2.45 |
| Emulsion stability |  | good | good | good | good | good | fair |
| Cured paint film properties |  |  |  |  |  |  |  |
| Wedge bend, % failure |  | 55 | 50 | 46 | 45 | 45 | 46 |
| Acid blush, (1% lactic) |  | 9+ | 10 | 10 | 10 | 10 | 9+ |
| Food process-stain resist. |  | 5 | 5 | 6 | 6 | 8 | 7 |
| Food process-adhesion |  | 7 | 7 | 8 | 8 | 10 | 9+ |

Control is a non-microgel copolymer of epoxy grafted with acrylic (70% epoxy, 30% acrylic) emulsified in water.

Although the merits of this invention have been specifically described and illustrated in the examples, the invention is not intended to be limited except by the appended claims.

I claim:

1. An aqueous dispersed coating composition containing an aqueous dispersed polymeric binder, the polymeric binder comprising:
    an aqueous dispersed microgel of a carboxyl functional, acrylic-epoxy grafted copolymer crosslinked with a high molecular weight, branched, multifunctional epoxide resin, where the microgel contains by weight between 50% and 95% said acrylic-epoxy grafted copolymer with the balance being the branched multifunctional epoxide resin;
    (a) where the acrylic-epoxy grafted copolymer is produced by non-aqueous copolymerization of ethylenically unsaturated monomer in the presence of epoxy resin at temperatures between about 80° and 180° C. in the presence of at least 1% peroxide initiator based on the weight of monomers, the ethylenic monomers having by weight at least 5% carboxyl monomer, to produce the carboxyl functional acrylic-epoxy grafted copolymer having an Acid No. above about 30, where said acrylic-epoxy grafted copolymer is dispersed in water by neutralizing at least part of the carboxyl functionality on said acrylic-epoxy grafted copolymer to preform an aqueous dispersion of carboxyl containing copolymer, (b) where the high molecular weight, branched multifunctional epoxide resin has a functionality above 2 and a number average molecular weight between about 400 and 6,000 and an epoxy equivalent weight between 400 and 3,000, and where the branched multifunctional epoxide is dispersed into the preformed aqueous dispersed carboxyl copolymer, (c) where the branched multifunctional epoxide resin is reacted with the aqueous dispersed carboxyl functional acrylic-epoxy grafted copolymer to form aqueous dispersed crosslinked microgel particles having a mean particle size below about 1 micron.

2. The coating composition of claim 1 where the microgel particle size is between about 0.02 and 0.2 microns.

3. The coating composition of claim 1 where the acrylic-epoxy grafted copolymer has an Acid No. between 70 and 300 prior to microgel formation.

4. The coating composition of claim 1 where the branched epoxide resin, prior to crosslinking, has an oxirane content between 0.6% and 4% oxirane oxygen, and a 1,2 epoxy equivalent functionality from about 2.2 to about 5.5 equivalents per mole of branched epoxide resin.

5. The coating composition of claim 1 where the ratio of weight average to number average molecular weight (Mw/Mn) of the branched epoxide resin is above 2.4.

6. The coating composition of claim 1 where the polymeric binder comprises by weight between 50% and 95% said grafted acrylic-epoxy copolymer, between 5% and 50% of said branched multifunctional epoxide resin, and between 4% and 12% of a low molecular weight diepoxide crosslinked with the acrylic-epoxy grafted copolymer.

7. The coating composition of claim 6 where the low molecular weight diepoxide resin, prior to crosslinking is a liquid diepoxide having a number average molecular weight between 200 and 5000, and epoxide equivalent weight between 100 and 2500, where the diepoxide resin is dispersed into the aqueous dispersed carboxyl copolymer and reacted with the carboxyl functional acrylic-epoxy grafted copolymer to form the aqueous dispersed crosslinked microgel particles.

8. In a process for producing an aqueous dispersed coating composition containing an aqueous dispersed, microgel polymeric binder, the process steps comprising:

copolymerizing ethylenically unsaturated monomer, including carboxyl functional monomer, by in-situ non-aqueous polymerization in the presence of epoxy resin and in the presence of at least 1% peroxide initiator based on the weight of the monomer copolymerized, at temperatures between about 80° C. and 180° C. to produce a carboxyl functional acrylic grafted epoxy copolymer having an Acid No. above 30;

dispersing the carboxyl functional acrylic grafted epoxy copolymer into water by neutralizing the carboxyl groups on the acrylic rafted epoxy copolymer to provide a prior formed aqueous dispersion of acrylic grafted epoxy copolymer;

dispersing a high molecular weight, branched, multifunctional epoxide resin having functionality above 2 into the prior formed aqueous dispersion of acrylic grafted epoxy copolymer; and crosslinking the multifunctional branched epoxide resin with the carboxyl functional acrylic grafted epoxy copolymer to produce stabilized, aqueous dispersed, microgel polymer particles having a mean particular size less than 1 micron.

9. The process of claim 8 where the acrylic-epoxy grafted copolymer is first dispersed into water and the multifunctional branched epoxide resin is dispersed into the aqueous dispersion of the said copolymer.

10. The process of claim 8 where a low molecular weight diepoxide resin is additionally dispersed into the aqueous dispersion of the carboxyl functional acrylic-epoxy grafted copolymer, and the diepoxide subsequently is reacted and crosslinked with the carboxyl functional acrylic grafted epoxy copolymer.

11. The process of claim 10 where the resulting microgel polymeric composition comprises by weight between 50% and 94% acrylic grafted epoxy copolymer, between 5% and 50% multifunctional branched epoxide resin, and between 1% and 12% low molecular weight diepoxide resin.

* * * * *